PULSE-COUNTER DEMODULATOR

Filed March 2, 1964 2 Sheets-Sheet 1

MICHAEL O. FELIX
INVENTOR.

BY James H. Griffin
ATTORNEY

Jan. 3, 1967 M. O. FELIX 3,296,539

PULSE-COUNTER DEMODULATOR

Filed March 2, 1964 2 Sheets-Sheet 2

MICHAEL O. FELIX
INVENTOR.

BY James H. Griffin
ATTORNEY

United States Patent Office 3,296,539

Patented Jan. 3, 1967

3,296,539

PULSE-COUNTER DEMODULATOR

Michael O. Felix, San Carlos, Calif., assignor to Ampex Corporation, Redwood City, Calif., a corporation of California Filed Mar. 2, 1964, Ser. No. 348,653
9 Claims. (Cl. 329—104)

This invention relates in general to circuitry for demodulating frequency modulated radio frequency (hereinafter abbreviated R.F.) signals and more particularly to transistorized demodulator circuits of the pulse-counter type.

Applicant's new pulse-counter circuit will be described in connection with the video playback system of a television tape recorder, but it is to be understood that the invention may be applied to frequency demodulators of all types, including those used in magnetic tape recorders, television, and radio detecting circuits. The record system of a television tape recorder frequency modulates the incoming television signal and records it on tape. In the magnetic tape recorder playback system herein described as an illustrative background for applicant's new circuit, the recorded frequency modulated signal is sensed from the tape by playback heads, then preamplified, switched together, compensated for various system nonlinearities and fed into a limiter. The output of the limiter is an approximation of a square wave and is fed into a demodulator of the pulse-counter type, the circuit component to which applicant's invention relates. The output of the pulse-counter is a series of pulses, to be filtered into an essentially variable direct current (D.C.) video output signal.

The primary and most difficult problem in the design of demodulators is that of suppressing or partially eliminating the fundamental and other harmonic components of the carrier waveform in the demodulated output. Unless the fundamental especially is suppressed down at least 40 decibels (hereinafter denoted "db") from the second harmonic, too much spurious signal or "noise" will appear in the demodulated output due to passage through of components of the carrier. To some extent, filtering can eliminate carrier components, especially those of double, triple or more of the basic carrier frequency or R.F. band. The R.F. band itself, however, approaches and even overlaps the frequency range of the demodulated output, making filtering impossible to the extent that "information" or non-noise components would be removed along with the noise.

In the pulse-counter type of demodulator to which applicant's invention is addressed, the output waveform is a series of pulses which are later smoothed to provide a varying D.C. video signal. The carrier fundamental components make their appearance in this waveform in two ways: by varying the amplitude (relative to each other) of the pulses and by varying the symmetry of the pulses from their evenly spaced position.

It is, therefore, a general object of this invention to provide an improved demodulator.

Another object of this invention is to provide a demodulator that eliminates carrier frequency components, especially the fundamental, by a method other than filtering.

Another object of this invention is to provide a demodulator that is less bulky and complex than prior demodulators of similar performance.

Another object is to provide a pulse-counter demodulator capable of achieving time and phase balance of its output pulses.

Another object of this invention is to provide a pulse-counter that is capable of correcting the relative amplitude of the output pulses so that the amplitude of each is the same.

Another object of this invention is to provide a pulse-counter demodulator that is capable of correcting the spacing of the output pulses of the unmodulated carrier so that they are all evenly spaced relative to each other.

In the achievement of the above and other objects and as a feature of applicant's invention there is provided a circuit wherein the input square waves from the limiter of the illustrative magnetic tape recorder playback system are first applied through an impedance matching device such as an emitter-follower transistor and then are differentiated by a capacitor to produce short pulses, a positive-going pulse for each leading edge of the input square wave and a negative-going pulse for each trailing edge of the negative square wave. The pulses are then applied across a push-pull transformer, the two output waveforms of which appear at the control electrodes of two transistors; each such pulse output should be 180° out-of-phase with the other when the original carrier is unmodulated.

As a feature of applicant's invention, the output electrodes of the two transistors are coupled to ground through a differential capacitor, the general effect of which is to delay the appearance of the pulses from both output electrodes at the output terminal of the circuit. In particular, depending on the adjustment of the differential capacitor, the pulses from one collector will be slightly delayed or advanced relative to the pulses from the other collector. Thus, by adjustment of the differential capacitor, it is possible to make the pulses from the two collectors equally spaced relative to each other.

As another feature of applicant's invention, the input electrode of one transistor is coupled through a variable resistor to ground. Thus, the amplitude of the output pulses of one transistor can be varied, using the variable resistor, to equal the amplitude of the pulses from the other transistor. In general, therefore, applicant's pulse-counter demodulator is able to eliminate all vestiges of the fundamental of the carrier waveform from the output pulses of the demodulator, both in respect of amplitude and also in respect of relative position, with the addition of only two adjustable components in the circuit.

Other objects and features of this invention and a fuller understanding thereof may be had by referring to the following description and claims taken in conjunction with the accompanying drawings, in which:

Figure 1:
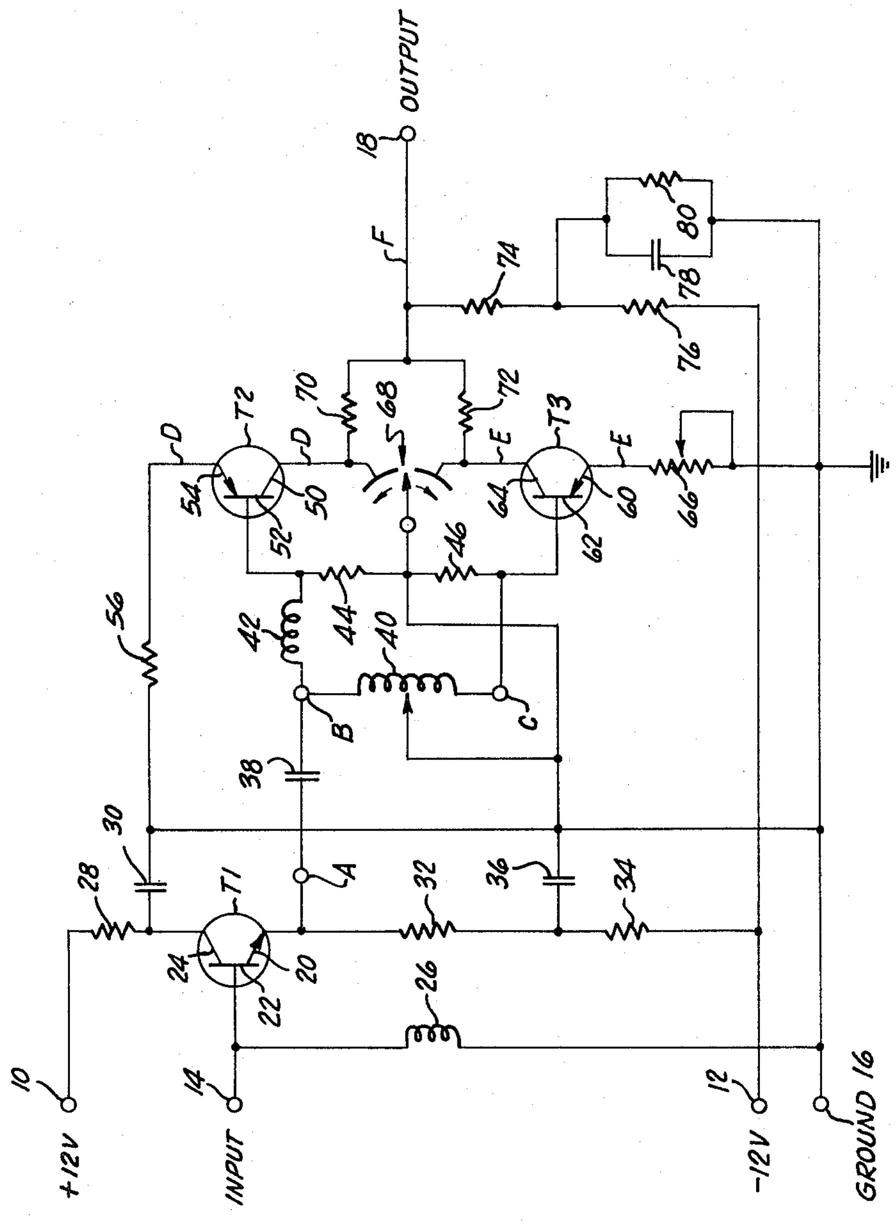
FIGURE 1 is a schematic drawing of a preferred embodiment of applicant's invention.

Referring to the schematic drawing in FIGURE 1, a circuit which is a preferred embodiment of applicant's invention has power supply terminals 10 and 12, an input terminal 14, a ground terminal 16, and an output terminal 18. For purposes of illustration, the power supplies 10 and 12 are specified as +12 volts and −12 volts, respectively.

A transistor T1, having emitter 20, base 22, and collector 24, has its base 20 directly coupled to the input terminal 14. The base 22 is coupled through an inductor 26 to ground 16. The collector 24 of the transistor T1 is coupled to the power supply 10 through a resistor 28 and is coupled to ground through a capacitor 30. The transistor T1 being in the emitter-follower configuration a load resistor 32 is coupled to the emitter 20. The other end of the load resistor 32 is coupled to the power supply 12 through a resistor 34 and is grounded through a capacitor 36. A capacitor 38 is directly coupled to the emitter 20 of the transistor T1.

The other end of the capacitor 38 is coupled to a push-pull transformer 40, the center of which is grounded. One end of the push-pull transformer 40 is coupled to ground through an inductor 42 and a resistor 44; the other end of the push-pull transformer 40 is coupled to ground through a resistor 46.

Two transistors T2 and T3 have emitters 54, 60, bases 52, 62, and collectors 50, 64, respectively. The bases 52, 62 of the two transistors T2 and T3 are coupled to the resistors 44, 46, respectively. The emitter 54 of the transistor T2 is coupled to ground through a resistor 56. The emitter 60 of the transistor T3 is coupled to ground through a variable resistor 66. The collectors 50, 64 of the transistors T2, T3 are coupled to the two fixed plates of a differential capacitor 68, the variable plate of which is coupled to ground 16. The collector 50 is coupled through a resistor 70 to the output terminal 18; the collector 64 is coupled through a resistor 72 to the output terminal 18. A resistor 74 is coupled to the junction point of the resistors 70, 72, the other end of the resistor 74 is coupled to the power supply 12 through a resistor 76 and is coupled to ground through a capacitor 78 and a resistor 80 in parallel.

Figure 2:
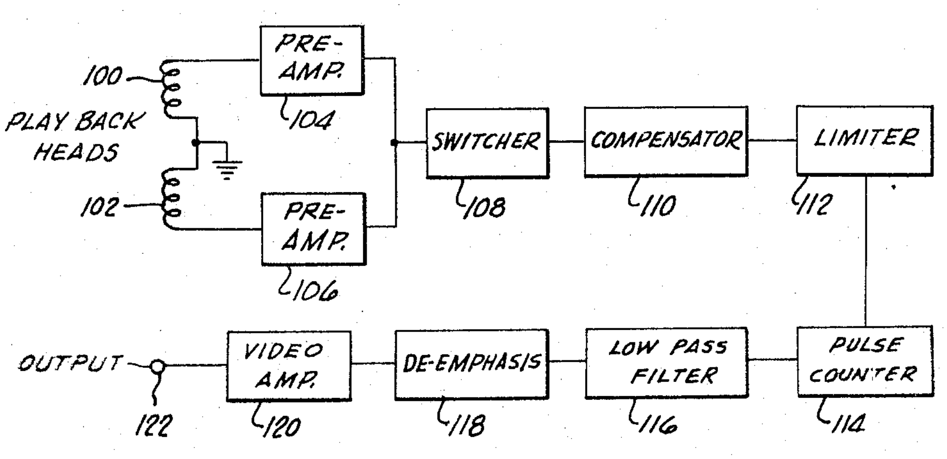
FIGURE 2 is a block diagram of a television tape recorder playback system in which applicant's new pulse-counter might be used.
Figure 3:
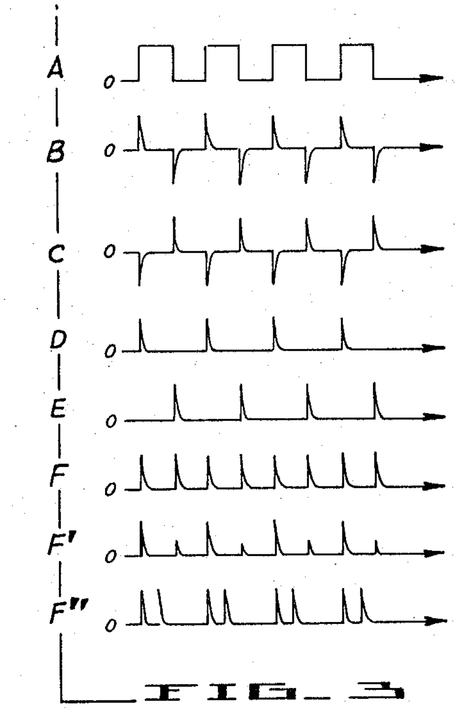
FIGURE 3 illustrates the waveforms at various points in FIGURE 1.

Referring to FIGURE 2, the circuit shown schematically in FIGURE 1 and described above appears in a television tape recorder playback system having playback heads 100, 102, preamplifiers 104, 106, and a switcher 108. The signals from the head 100, 102 are compensated for various system nonlinearities and other defects at 110. A limiter 112 reduces the peaks of the signal waves resulting in the appearance of the waveform shown at FIGURE 3A at the input terminal 14 of a pulse counter demodulator circuit 114. The output of the pulse counter 114 is shown at FIGURE 3F. After emerging from the pulse counter 114, the waveform F is processed by a low pass filter 116 to produce a variable D.C. video output signal. This video output signal is compensated at 118 for various over-emphasis that occurs during recording and then is amplified at 120 to its final output strength for appearance at the system output terminal 122.

In the operation of the circuit shown schematically in FIGURE 1 and described above, the waveform shown in FIGURE 3A (from the limited 112) is applied at the input terminal directly coupled to the base 22 of the emitter-follower transistor T1. The inductor 26 ensures that all D.C. currents emerging from the base 22 of the transistor T1 do not go forward of the input terminal 14, but rather, flow directly to ground. Likewise, the capacitors 30 and 36 insure that A.C. signals either on the collector 24 or between the resistors 32 and 34 are directed to ground. The transistor T1 being in the emitter-follower configuration, the waveform at point A is approximately the same as that appearing at the input terminal 14. Thus, the square wave A, the output of the emitter-follower T1, becomes the input to the capacitor 38.

The output of the R-C differentiation circuit composed of the capacitor 38 and the resistor 44 is the waveform shown at FIGURE 3B, the differential of the waveform A. Since the inductor 42 has no other effect but that of balancing the leakage inductance of the push-pull transformer 40, the waveform appearing at B is essentially the input to the transistor T2, applied at the base 52. The signal at the other end of the push-pull transformer 40 (shown at FIGURE 3C) is approximately 180° out-of-phase with the waveform B and is applied at the base 62 of the transistor T3. The transistors T2 and T3 being of the P-N-P conductivity type and being biased so that they conduct positive-going signals but not negative-going signals, the result of applying waveform B to the base 52 of the transistor T2 is the waveform shown in FIGURE 3D, appearing on the collector 50, while the result of the waveform C applied at the base 62 of the transistor T3 is the waveform shown in FIGURE 3E, on the collector 64. The waveform shown in FIGURE 3F is the summation of the waveforms D and E appearing at the output terminal 18.

FIGURE 3F′ shows the effect on the output waveform F appearing at the output terminal 18 of the fundamental of the square wave A. The amplitude of the pulses from the transistor T2 (waveform D) and from the transistor T3 (waveform E) are not the same. This can be off-set by the adjustment of the variable resistor 66.

The waveform shown in FIGURE 3F″ shows the effect on the symmetry of the output pulses of applicant's pulse counter of the fundamental of the square wave A from the limiter 112. The pulses from the transistor T2 and from the transistor T3 are not evenly spaced; rather, the interval between a pulse from the transistor T2 and the following pulse from the transistor T3 is short, whereas the interval between a pulse from the transistor T3 and the following pulse from the transistor T2 is long. This can be remedied by the adjustment of the differential capacitor 68, whereby the difference in time delay introduced in the two pulses is varied to the point where the time interval between them becomes the same.

A pulse-counter demodulator in accordance with the above description and drawing was built and operated using the following components:

*Voltages*

| | | | |
|---|---|---|---|
| **10** | +12V. | **12** | −12 |

*Transistors*

| | | | |
|---|---|---|---|
| T1 | 2N706A | T3 | 2N976 |
| T2 | 2N976 | | |

*Resistors (ohms)*

| | | | |
|---|---|---|---|
| **28** | 270 | **66** | 200 |
| **32** | 470 | **70** | 220 |
| **34** | 22K | **72** | 220 |
| **44** | 220 | **74** | 1200 |
| **46** | 220 | **76** | 470 |
| **56** | 47K | **80** | 3300 |

*Capacitors (microfarads)*

| | | | |
|---|---|---|---|
| **30** | .01 | **68** | $15.2\times10^{-6}$ |
| **36** | .1 | **78** | 100 |
| **38** | $100\times10^{-6}$ | | |

*Inductors (microhenries)*

| | | | |
|---|---|---|---|
| **26** | 330 | **42** | .33 |

*Transformer*

40—two 20 microhenry windings connected in series

Thus applicant has provided a new and improved pulse-counter demodulator that eliminates carrier frequency components, especially the fundamental, by a method other than filtering, so that frequencies of the demodulated signal that overlap the carrier frequency bandwidth are not disturbed in the process. The pulse counter is capable of correcting the relative amplitude of the output pulses so that the amplitude of each is the same and can also correct the spacing of the output pulses so that they are all evenly spaced relative to each other. Yet all of this has been achieved by a circuit more economical in design and less bulky and complex than prior demodulators of similar performance.

A number of alternative arrangements will readily suggest themselves to those skilled in the art. For example, N–P–N conductivity type transistors and P–N–P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A pulse-counter demodulator comprising: an input terminal, a differentiating capacitor coupled to the input terminal, a push-pull transformer with its center directly coupled to ground, with one end directly coupled to the differentiating capacitor and through a first resistor to ground, and with a second end coupled through a second resistor to ground, a first active element having control electrode and output electrode, the control electrode of the first active element being coupled between the transformer and the first resistor and the output electrode of the first active element being coupled through a third resistor to an output terminal for the demodulator circuit, a second active element having input, output, and control electrodes, the control electrode of the second active element being directly coupled between the transformer and the second resistor, and the output electrode of the second active element being coupled through a fourth resistor to the output terminal, and a differential capacitor having a variable plate and two fixed plates, the variable plate being directly coupled to ground, one fixed plate being directly coupled to the output electrode of the first active element and the other fixed plate being directly coupled to the output electrode of the second active element.

2. A pulse-counter demodulator comprising: an input terminal, a differentiating capacitor coupled to the input terminal, a push-pull transformer with its center directly coupled to ground, with one end directly coupled to the differentiating capacitor and through a first resistor to ground, and with a second end coupled through a second resistor to ground, a first active element having control electrode and output electrode, the control electrode of the first active element being coupled between the transformer and the first resistor, and the output electrode of the first active element being coupled through a third resistor to an output terminal for the demodulator circuit, a scond active element having input, output, and control electrodes, the input electrode of the second element coupled through a variable resistor to ground, the control electrode of the second active element being directly coupled between the transformer and the second resistor, and the output electrode of the second active element being coupled through a fourth resistor to the output terminal, and a differential capacitor having a movable plate and two fixed plates, the movable plate being directly coupled to ground, one fixed plate being directly coupled to the output electrode of the first active element and the other fixed plate being directly coupled to the output electrode of the second active element.

3. A pulse-counter demodulator comprising: an input terminal, a differentiating capacitor coupled to the input terminal, a push-pull transformer with its center directly coupled to ground, with one end directly coupled to the differentiating capacitor and through a first resistor to ground, and with a second end coupled through a second resistor to ground, a first transistor having emitter, base, and collector, the base of the first transistor being coupled between the transformer and the first resistor, and the base collector of the first transistor being coupled through a third resistor to an output terminal for the demodulator circuit, a second transistor having emitter, base, and collector, the base of the second transistor being directly coupled between the transformer and the second resistor, and the collector of the second transistor being coupled through a fourth resistor to the output terminal, and a differential capacitor having a variable plate and two fixed plates, the variable plate being directly coupled to ground, one fixed plate being directly coupled to the collector of the first transistor and the other fixed plate being directly coupled to the collector of the second transistor.

4. A pulse-counter demodulator comprising: an input terminal, a differentiating capacitor coupled to the input terminal, a push-pull transformer with its center directly coupled to ground, with one end directly coupled to the differentiating capacitor and through a first resistor to ground, and with a second end coupled through a second resistor to ground, a first transistor having emitter, base, and collector, the base of the first transistor being coupled between the transformer and the first resistor and the collector of the first transistor being coupled through a third resistor to an output terminal for the demodulator circuit, a second transistor having emitter, base, and collector, the emitter of the second transistor being coupled through a variable resistor to ground, the base of the second transistor being directly coupled between the transformer and the second resistor, and the collector of the second transistor being coupled through a fourth resistor to the output terminal, and a differential capacitor having a variable plate and two fixed plates, the variable plate being directly coupled to ground, one fixed plate being coupled to the collector of the first transistor, and the other fixed plate being directly coupled to the collector of the second transistor.

5. A pulse-counter demodulator comprising: an input terminal, an output terminal, a first transitor having emitter, base, and collector, the base of the first transitor being directly coupled to the input terminal, a differentiating capacitor coupled to the emitter of the first transitor, a push-pull transformer with its center directly coupled to ground, with one end directly coupled to the differentiating capacitor and through a first resistor to ground, and with a second end coupled through a second resistor to ground, a second transistor, a base of the second transistor being coupled between the transformer and the first resistor, and a collector of the second transitor being coupled through a third resistor to the output terminal, a third transistor, an emitter of the third transistor being coupled through a variable resistor to ground, a base of the third transistor being directly coupled between the transformer and the second resistor, and a collector of the third transistor being coupled through a fourth resistor to the output terminal, and a differential capacitor having a movable plate and two fixed plates, the movable plate being directly coupled to ground, one fixed plate being directly coupled to the collector of the second transistor, and the other fixed plate being directly coupled to the collector of the third transistor.

6. A pulse-counter demodulator comprising: an input terminal, a positive power supply, a negative power supply, a first transistor having emitter, base, and collector, the base of the first transistor being directly coupled to the input terminal, the collector of the first transistor being coupled through a first resistor to the positive power supply, the emitter of the first transistor being coupled through a second resistor to the negative power supply, a differentiating capacitor coupled to the emitter of the first transistor, a push-pull transformer with its center directly coupled to ground, with one end directly coupled to the differentiating capacitor and through a third resistor to ground, and with a second end coupled through a fourth resistor to ground, a second transistor having emitter, base, and collector, the emitter of the second transistor being coupled through a fifth resistor to ground, the base of the second transistor being coupled between the transformer and the third resistor, and the collector of the second transistor being coupled through a sixth resistor to an output terminal for the demodulator circuit, a third transistor having emitter, base, and collector, the emitter of the third transistor being coupled through a variable resistor to ground, the base of the third transistor being directly coupled between the transformer and the fourth resistor, and the collector of the third transistor being coupled through a seventh resistor to the output terminal, a differential capacitor having a variable plate and two fixed plates, the variable plate being directly coupled to ground, one fixed plate being directly coupled to the collector of the second transistor and the other fixed plate being directly coupled to the collector of the third transistor, and an eighth resistor coupled from the point of junction of the sixth and seventh resistors to the negative power supply.

7. A pulse-counter demodulator comprising: an input terminal, a positive power supply, a negative power supply, a first transistor having emitter, base, and collector, the base of the first transistor being directly coupled to the input terminal, the collector of the first transistor being coupled through a first resistor to the positive power supply, the emitter of the first transistor being coupled through a second resistor to the negative power supply, a differentiating capacitor coupled to the emitter of the first transistor, a push-pull transformer with its center directly coupled to ground, with one end directly coupled to the differentiating capacitor and through an inductor and a third resistor to ground, and with a second end coupled through a fourth resistor to ground, a second transistor having emitter, base, and collector, the emitter of the second transistor being coupled through a fifth resistor to ground, the base of the second transistor being coupled between the inductor and the third resistor, and the collector of the second transistor being coupled through a sixth resistor to an output terminal for the demodulator circuit, a third transistor having emitter, base, and collector, the emitter of the third transistor being coupled through a variable resistor to ground, the base of the third transistor being directly coupled to the second end of the push-pull transformer, and the collector of the third transistor being coupled through a seventh resistor to the output terminal, a differential capacitor having a variable plate and two fixed plates, the variable plate being directly coupled to ground, one fixed plate being directly coupled to the collector of the second transistor and the other fixed plate being directly coupled to the collector of the third transistor, an eighth resistor coupled to the point of junction of the sixth and seventh resistors, a ninth resistor running from the eighth resistor to the negative power supply, and a tenth resistor and a decoupling capacitor in parallel between the eighth resistor and ground.

8. A pulse-counter demodulator comprising: a differentiating capacitor, a push-pull transformer with one end directly coupled to the differentiating capacitor, a first active element having control electrode and output electrode, the control electrode of the first active element being coupled to a first end of the transformer and the output electrode of the first active element being coupled through a first resistor to an output terminal for the demodulator circuit, a second active element having input, output, and control electrodes, the input electrode of the second active element being coupled through a variable resistor to ground, the control electrode of the second active element being coupled to a second end of the transformer, and the output electrode of the second active element being coupled through a second resistor to the output terminal, and a differential capacitor having a variable plate and two fixed plates, the variable plate being directly coupled to ground, one fixed plate being directly coupled to the output electrode of the first active element, and the other fixed plate being directly coupled to the output electrode of the second active element.

9. A pulse-counter demodulator comprising: a differentiating capacitor, a push-pull transformer with one end coupled to the differentiating capacitor, a first active element having control electrode and output electrode, the control electrode of the first active element being coupled to one end of the transformer, a second active element having input, output, and control electrodes, the input element of the second element being coupled through a variable resistor to ground, the control element of the second active element being coupled to a second end of the transformer, and a differential capacitor having a variable plate and two fixed plates, one fixed plate being directly coupled to the output electrode of the first active element and the other fixed plate being directly coupled to the output electrode of the second active element, the variable plate being connected to a reference potential source.

References Cited by the Examiner

UNITED STATES PATENTS

| | | | |
|---|---|---|---|
| 3,086,175 | 4/1963 | Barditch et al. | 329—103 X |
| 3,103,634 | 9/1963 | Nelson et al. | 329—137 X |
| 3,217,263 | 11/1965 | Starreveld et al. | 329—103 X |
| 3,231,824 | 1/1966 | Drapkin | 329—106 |

NATHAN KAUFMAN, *Primary Examiner.*

ROY LAKE, *Examiner.*

A. L. BRODY, *Assistant Examiner.*